UNITED STATES PATENT OFFICE.

CARLETON ELLIS, OF MONTCLAIR, NEW JERSEY.

PROCESS OF REDUCING OR HYDROGENATING ORGANIC BODIES.

1,182,995. Specification of Letters Patent. Patented May 16, 1916.

No Drawing. Application filed August 26, 1915. Serial No. 47,498.

*To all whom it may concern:*

Be it known that I, CARLETON ELLIS, a citizen of the United States, and a resident of Montclair, in the county of Essex and State of New Jersey, have invented certain new and useful Improvements in Processes of Reducing or Hydrogenating Organic Bodies, of which the following is a specification.

This invention relates to a process of hydrogenating organic bodies, or treating organic bodies with hydrogen, but applicable to fatty oils containing unsaturated fatty acids or their esters by the use of particular catalyzers.

The invention contemplates especially the use of catalyzers consisting of or containing a carbid of a catalytic metal, or analogous body with or without associated carbonaceous material.

The present application is in part a continuation of Serial Nos. 686,988 and 679,771, filed Mar. 29, 1912 and Feb. 24, 1912, respectively, especially as regards the use of carbids and of carbonaceous material.

Bodies of a catalytic nature comprised herein embrace particularly compounds of nickel, copper and cobalt and also chromium, manganese, titanium, molybdenum, vanadium and the like, and the catalysts comprising the carbid of one or more of these metals are hereinafter referred to generically under the expression "a carbid catalyst of the nickel carbid type."

The catalytic material may be prepared in the form of a fine powder without support or it may be supported on inert carriers such as pumice, clay, kieselguhr and the like. Coöperating catalytic material of a hydrogen-occluding character such as active carbon or carbonaceous material may be employed. In the preferred embodiment, nickel material is employed and the carbid or carbid-containing catalytic may be prepared in several ways, of which the following will serve as illustrations: A soluble salt of nickel is precipitated with carbonate of soda or other suitable precipitant, avoiding catalyzer poisons, the precipitate collected, a little sugar, dextrin or other suitable carbonaceous binding agent added, and the mixture incorporated with granular charcoal. This composition is dried and heated in a current of hydrogen. By such heating the nickel is reduced and in the presence of the carbon or carbonaceous material carbid is formed to a greater or less degree depending on the temperature and length of time of reduction, yielding finely-divided material containing nickel carbid of a relatively stable character. Or nickel hydrate may be dissolved in an aqueous solution of sugar, dried and heated with hydrogen to form the nickel-containing carbid. The presence of an extraneous reducing gas is not necessary as the charcoal or sugar or other carbonaceous material will effect the required reduction without the introduction of reducing gas from an outside source. A compound containing carbon and oxygen of the nature of a carbohydrate is especially suited for such reduction and also yields some free carbon. The carbohydrate should be free from catalyzer poisons. Similarly, nickel salts of organic acids, such as the acetates, tartrates, citrates, benzoates and the like may be heated, with or without a reducing gas, to form the carbid material with more or less free carbon or carbonaceous material. The reduction may progress completely or the operation may be stopped short of complete reduction, at the desired point, giving oxid-containing material. Mixtures of nickel and another element such as nickel and copper may be used, to secure the joint effects of both elements. Other elements may likewise be used in admixture. The degree of conversion of the nickel particles into carbid depends as stated on the length of treatment and temperature employed. Temperatures of 200°–400° C. are recommended, but best results are obtained at points more nearly approaching the higher, than the lower range specified. The heating operation may be carried on to yield a catalyzer having various proportions of free or combined carbon according to requirements. Nickel oleate may be heated to form a mixture of metal and carbid. While heating, preferably air is excluded, and the mass may with advantage be stirred during the reducing operation.

The carbid catalyzer has several features of advantage over ordinary nickel catalyzer, one of which is the improved stability and operative qualities of a properly made product under the present invention.

To recapitulate, my invention relates to a catalytic product consisting of or containing carbid, and also relates to the process of preparing catalyzer comprising heating nickel or similar reducible material associated, physically or chemically with a carbonaceous reducing agent, to a reducing temperature, whereby finely-divided or comminuted catalytic material substantially or essentially free from catalyzer poisons, and in a state of high activity is obtained, such catalyzer being specifically adapted to carry out the process of saturating unsaturated fatty bodies with hydrogen.

What I claim is:—

1. A process of effecting a reaction between reducible organic bodies and free hydrogen, which comprises subjecting such bodies to the action of hydrogen in the presence of a catalytic body comprising "a carbid catalyst of the nickel carbid type" deposited upon a support, at a temperature at which said bodies react with hydrogen in the presence of said catalyst.

2. A process of effecting a reaction between reducible organic bodies and free hydrogen, which comprises subjecting such bodies to the action of hydrogen in the presence of a catalytic body comprising "a carbid catalyst of the nickel carbid type" deposited upon an active carrier having hydrogen-occluding properties, at a temperature at which said bodies react with hydrogen in the presence of said catalyst.

3. A process of effecting a reaction between reducible organic bodies and free hydrogen, which comprises subjecting such bodies to the action of hydrogen in the presence of a catalyst comprising nickel carbid, at a temperature at which said bodies react with hydrogen in the presence of said catalyst.

4. A process of effecting a reaction between reducible organic bodies and free hydrogen, which comprises subjecting such bodies to the action of hydrogen in the presence of a catalyst comprising carbids of nickel and another metal having the property of catalytically aiding a reaction between hydrogen and said organic bodies, at a temperature at which said bodies react with hydrogen in the presence of said catalyst.

CARLETON ELLIS.